Figure 1:
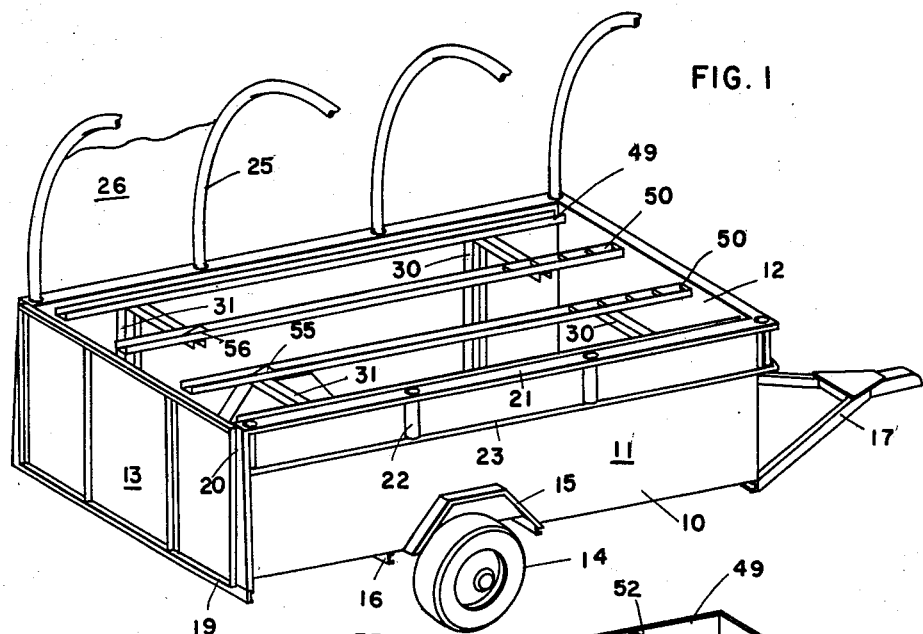

Sept. 15, 1964     C. V. BOYER ETAL     3,148,911
AMBULANCE TRAILER
Filed April 5, 1962

INVENTORS
CHARLES V. BOYER
KENNETH R. BOYER
BY
Charles L. Lovercheck
attorney

United States Patent Office 3,148,911
Patented Sept. 15, 1964

3,148,911
AMBULANCE TRAILER
Charles V. Boyer and Kenneth R. Boyer, Erie, Pa., assignors, by mesne assignments, to Charles L. Lovercheck, Erie, Pa.
Filed Apr. 5, 1962, Ser. No. 185,367
1 Claim. (Cl. 296—19)

This invention relates to vehicles and, more particularly, to the type of vehicles known as ambulance trailers.

In order for a trailer to efficiently function for hauling patients from battlefileds and the like, the trailer must be simple so that it can be cleaned easily, yet the supports for the patient must be rigid so that the patient will not be shaken unduly during transportation. At the same time, the support for the patient must be comfortable.

It is, accordingly, an object of this invention to provide an improved ambulance type vehicle.

Another object of the invention is to provide an ambulance type vehicle which is simple in construction, economical to manufacture, and simple and efficient to use.

With the above and other objects in view, the present invention consists of the combination and arrangement of parts hereinafter more fully described, illustrated in the accompanying drawing and more particularly pointed out in the appended claims, it being understood that changes may be made in the form, size, proportions, and minor details of construction without departing from the spirit or sacrificing any of the advantages of the invention.

Figure 2:
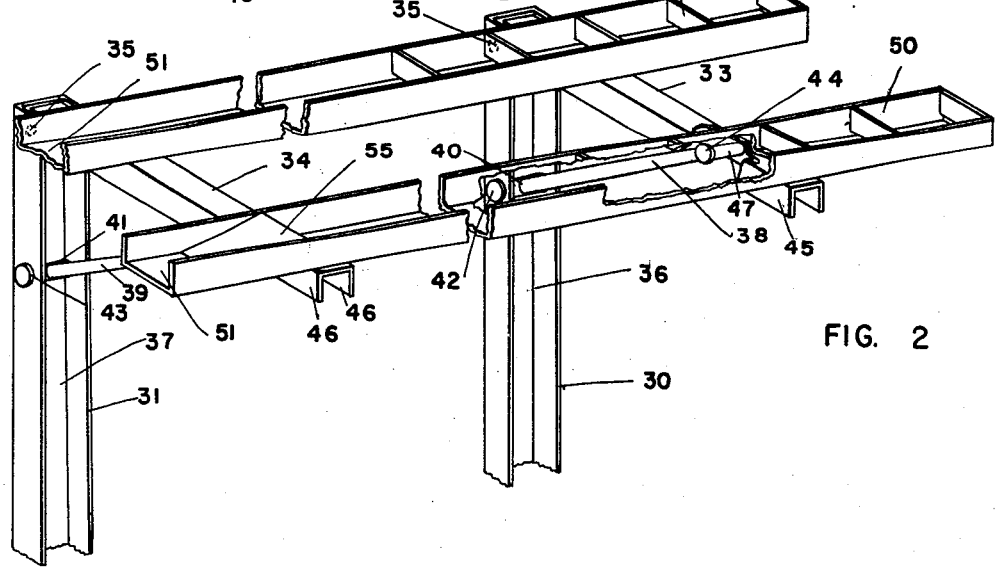

In the drawing:

FIG. 1 is an isometric view of an ambulance trailer according to the invention; and FIG. 2 is an enlarged partial view of one of the stretcher supports for the trailer.

Now with more particular reference to the drawing, the vehicle is made up of a box or body 10 having vertically extending, relatively high sides 11, a front end gate 12, and a rear end gate 13. A suitable axle and wheels 14 support the vehicle and small fenders 15 are welded to the sides of the box 10 to prevent dirt and water from being thrown on the floor of the vehicle. A suitable frame 16 is provided supporting the body on wheels. A tongue 17 is fixed to the front of the vehicle for attaching it to a towing vehicle.

The rear end gate 13 is hinged at its lower edge to the frame 16 at 19 and suitable fastening means are provided at the top at 20 for fastening the rear end gate 13 in the vertical position as shown.

The sides of the body 10 have laterally extending flange members 21 thereon which extend outwardly. The members 21 have bores which line up with holes in pipes 22 which rest on top of laterally extending plates 23. The pipes 22 receive bow members 25 which may be in the form of iron water pipes bent in suitable shape and are provided to have a canvas cover 26 supported thereover to provide a cover for the vehicle.

Vertically extending channels 30 and 31 are welded to the inner sides of the vehicle. They extend from the bottom up to a point adjacent the top and form a support for relatively short channels 33 and 34. The channels 33 and 34 have a pin 35 therethrough which forms a hinge and thus allows them to swing upwardly and downwardly. The legs of the channels 30 and 31 extend inwardly toward the center of the trailer body.

Support members 38 and 39 have laterally extending bored members 40 and 41, respectively, attached thereto. These bored members receive pins 42 and 43 so that the support members 38 and 39 can swing upwardly and downwardly. Pins 44 extend through legs 45 and 46 of the channels 33 and 34 and through bored members 47 to hold them in place. Therefore, when the pins 44 are removed, the channels 33 and 34 as well as the support members 38 and 39 will swing downwardly to a position adjacent the sides of the body 10 and, therefore, will not interfere with lading which might be hauled in the trailer.

Upwardly facing elongated channels 49 and 50 have their webs 51 welded to the webs on the channels 33 and 34. Partition members 52 are welded to the elongated channels adjacent the front end and they provide spaces therebetween to receive one leg of a stretcher. The rear legs of the stretcher may rest against rear stops 55 and 56.

In use, the elongated channels 49 and 50 can be swung upward to the position shown and the pins 44 put in position to hold them rigidly in position. Then a stretcher can be put at each side of the trailer on top of the elongated channels, one channel at each side of each stretcher, with the legs of the stretchers received between the partition members 52 and the rear legs being stopped from rearward movement by the stops 55 and 56. It will be noted that the stops 55 and 56 have rearward portions inclined upwardly and forwardly. Each stop has a generally vertically extending front portion so that the stretcher can be slid over it easily but will not readily slip off rearwardly. With the two upper stretchers in position, two lower stretchers can be supported directly on the floor of the vehicle, one at each side under each pair of elongated channels 49 and 50.

It will be noted that the webbing of the stretchers will be supported above the channels 33 and 34 so that the body of the patient will not engage them and, therefore, the patient will rest comfortably. The patient will be held rigidly against forward and rearward movement by the partition members 52.

The foregoing specification sets forth the invention in its preferred practical forms but the structure shown is capable of modification within a range of equivalents without departing from the invention which is to be understood is broadly novel as is commensurate with the appended claim.

The embodiments of the invention in which an exclusive property or privilege is claimed are defined as follows:

An ambulance vehicle comprising
a relatively deep trailer box having upstanding side walls,
a front end gate fixed to said side walls at its ends and extending therebetween,
and a rear end gate hinged at its bottom to said vehicle and swingable from an open to a closed position,
spaced vertically extending channel members having webs and legs,
the webs of said channel members being attached to said side walls and their open sides facing inwardly,
said vertically extending channel members terminating adjacent the tops of said walls,
relatively short channel members each having webs and legs,
each said short channel member having its legs at one end received between the legs of said vertically extending channel members,
pins extending through the legs of each said channel whereby said short channels are swingably attached to said vertically extending channel members adjacent their upper ends,
said short channels being adapted to swing from a vertically depending position to a horizontal position with their webs upward and legs depending,
brace members each having its lower end received between said legs of said vertically extending channels,
means swingably attaching said lower ends of said brace members to said vertically extending channel member legs at a point spaced below the connection of said short channel members to said vertically extending channel members, said brace members being removably attached at their upper ends to said short channel members, spaced elongated channels extending parallel to said side walls and having their webs fixed to said short channel members and their legs extending upwardly generally perpendicular therefrom, defining open channels for receiving the legs of a stretcher, each said elongated channel having spaced partitions adjacent the front ends thereof between the legs of said elongated channels, said partitions being adapted to receive the legs of stretchers in the spaces therebetween in said open channels, and rear partition members disposed in each said elongated channel member adjacent the rear ends thereof, each said rear partition member having a rear surface inclined upwardly and forwardly and a front surface disposed vertically, said rear surfaces being adapted to guide the leg of a stretcher up over it as said stretcher is moved into said trailer, the legs of said front surface of said rear partition being adapted to form a stop to limit the rearward sliding of the rear legs of a stretcher in said channel.

References Cited in the file of this patent

UNITED STATES PATENTS

| | | |
|---|---|---|
| 1,284,936 | Shine | Nov. 12, 1918 |
| 2,569,965 | Wiedman | Oct. 2, 1951 |

FOREIGN PATENTS

| | | |
|---|---|---|
| 457,168 | Great Britain | Nov. 23, 1936 |
| 798,558 | Great Britain | July 23, 1958 |